(12) United States Patent
Christensen et al.

(10) Patent No.: US 7,658,594 B2
(45) Date of Patent: Feb. 9, 2010

(54) WIND TURBINE, HYDRAULIC SYSTEM, AIR BLEED SYSTEM AND METHOD OF CONTROLLING AT LEAST TWO WIND TURBINE BLADES

(75) Inventors: Mogens Christensen, Tjele (DK); Lars Budtz, Nevarra (DK)

(73) Assignee: Vestas Wind Systems A/S (DK)

( * ) Notice: Subject to any disclaimer, the term of this patent is extended or adjusted under 35 U.S.C. 154(b) by 0 days.

(21) Appl. No.: 10/512,607

(22) PCT Filed: Apr. 24, 2002

(86) PCT No.: PCT/DK02/00266

§ 371 (c)(1),
(2), (4) Date: Jan. 9, 2006

(87) PCT Pub. No.: WO03/091577

PCT Pub. Date: Nov. 6, 2003

(65) Prior Publication Data

US 2006/0188371 A1    Aug. 24, 2006

(51) Int. Cl.
*F03D 11/00* (2006.01)
(52) U.S. Cl. .................... 416/157 A; 416/157 R; 416/156
(58) Field of Classification Search .......... 416/156, 416/157 R, 157 B, 157 A, 158
See application file for complete search history.

(56) References Cited

U.S. PATENT DOCUMENTS

| | | | |
|---|---|---|---|
| 1,700,394 A | 1/1929 | Young | |
| 2,761,518 A | 9/1956 | Treseder et al. | |
| 2,777,525 A | 1/1957 | Liaaen | |
| 2,955,663 A | 10/1960 | Brandes et al. | |
| 4,352,634 A * | 10/1982 | Andrews | 416/154 |
| 4,379,678 A * | 4/1983 | Carlock et al. | 416/98 |
| 4,750,862 A * | 6/1988 | Barnes et al. | 416/46 |
| 5,001,901 A | 3/1991 | Erickson et al. | |
| 5,470,204 A * | 11/1995 | Schafer et al. | 416/157 R |
| 5,853,071 A * | 12/1998 | Robinson | 188/352 |

FOREIGN PATENT DOCUMENTS

| | | |
|---|---|---|
| DE | 101 46 969 | 6/2002 |
| GB | 2 071 779 | 9/1981 |
| JP | 57000376 | 1/1982 |
| JP | 2002276535 | 9/2002 |
| WO | WO 02/48545 | 6/2002 |

OTHER PUBLICATIONS

Examination Report Regarding European Patent Application No. 02 735 089.1; Sep. 2, 2005.
International Search Report; PCT/DK02/00266; Mar. 10, 2003.

* cited by examiner

*Primary Examiner*—Ninh H Nguyen
(74) *Attorney, Agent, or Firm*—Cantor Colburn LLP (57) ABSTRACT

The invention relates to a wind turbine having rotating means including at least two wind turbine blades which are turnable around the longitudinal axis of said blades, and a wind turbine hub connecting said at least two wind turbine blades with at least one shaft. Further, the wind turbine includes hydraulic means for actuating said at least two wind turbine blades, said hydraulic means being incorporated in said rotating means. The invention also relates to a hydraulic system, an air bleed system and a method of controlling at least two wind turbine blades.

6 Claims, 8 Drawing Sheets

WIND TURBINE, HYDRAULIC SYSTEM, AIR BLEED SYSTEM AND METHOD OF CONTROLLING AT LEAST TWO WIND TURBINE BLADES

FIELD OF THE INVENTION

The present invention relates to a wind turbine, a hydraulic system, an air bleed system and a method of controlling at least two wind turbine blades.

BACKGROUND OF THE INVENTION

In modern wind turbines, one of two systems is used to control the power generated by the turbine generators, especially in situations of excess winds. Both control systems involve a reduction in the lifting force transferred from the wind to the rotor blades of the wind turbine.

By the first method, the pitch system, control is obtained by pitching the blades around the longitudinal axis.

By the second method, the stall system, control is obtained by using a blade profile designed to stall when situations of excess winds occur. In large wind turbines, the stall system may be combined with pitchable blades in order to establish a so-called active stall system.

Figure 1:
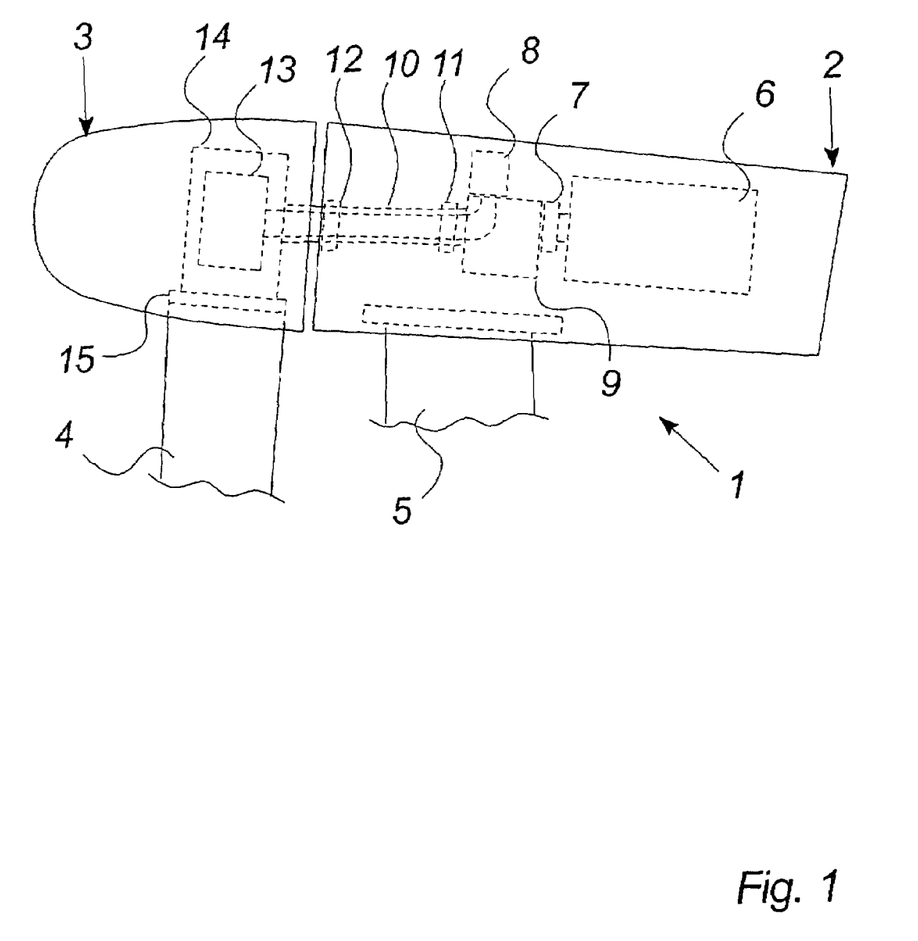
FIG. 1 shows a prior art hydraulic system for a wind turbine.

FIG. 1 shows a prior art pitch system in which the necessary force for pitching the blades is supplied by a hydraulic system. The main part of the hydraulic system is positioned in the nacelle of the wind turbine and provides hydraulic pressure to a number of actuators through a hollow low-speed shaft. The actuators are positioned in the wind turbine hub which connects the blades with the shaft. The actuators transform the hydraulic pressure into mechanical force used when pitching the blades.

With the prior art control systems comprising hydraulics, a number of problems have come into view. In particular, the arrival of large, megawatt wind turbines has exposed problems with the hydraulic systems and the transmission of hydraulic pressure from stationary to rotating components of the hydraulic systems in the wind turbines. Also, the necessary hollow shafts are not suitable or useable in connection with large wind turbines and are generally too expensive in production. The distance between the different hydraulic components may result in significant pressure capacity loss and a knocking noise affecting the lifetime of the hydraulic components.

SUMMARY OF THE INVENTION

The invention establishes a wind turbine without the above-mentioned disadvantages. Especially, the invention establishes a hydraulic system that may be used in all wind turbines regardless of size.

In accordance with the invention, a wind turbine comprising rotating means including at least two wind turbine blades (4) which are turnable around the longitudinal axis of said blades, and a wind turbine hub connecting said at least two wind turbine blades (4) with at least one shaft (7, 16), hydraulic means (17) for actuating said at least two wind turbine blades (4), said hydraulic means (17) being incorporated in said rotating means.

By including all of the hydraulic means in the rotating means, the distance between the hydraulic components and thus the pressure capacity loss may be kept low.

Further, the development in the wind turbine industry has led to more and more compact gears. When creating compact gears, the use of hollow shafts is not possible as the diameter of these shafts is too large and if the shafts of the compact gears are hollowed out, the risk of collapse increases significantly.

Even further, the costs of hollowing out the shafts and the accompanying hydraulic components may be avoided.

At the same time, space may be saved in the nacelle which allows for a reduction in size while using "free space" in connection with the hub.

The term "rotating means" is to be understood as the means of a wind turbine which rotates in relation to the nacelle of the wind turbine such as the rotor, the hub and the shafts.

The term "actuating" is to be understood as force used to move a wind turbine blade into a new position or to maintain the wind turbine blade in its position when other forces are trying to move it.

In an aspect of the invention, said hydraulic means (17) may include at least one hydraulic tank (20), at least one hydraulic pump (21, 25), at least two hydraulic actuators (22) actuating said at least two wind turbine blades (4), at least one air bleed system (43), at least one hydraulic filter (26), and heating means (18) and/or cooling means (27).

The actuators may hereby be provided with hydraulic pressure from the pump over a limited distance as the pump (and tank) and the actuators may be positioned in close proximity of each other.

In a further aspect of the invention, said hydraulic means (17) is positioned in relation to a rotation center line (cl) of said rotating means.

Hereby, it is possible to add hydraulic means to the rotating means without creating symmetric balance problems in the rotating means of the wind turbine. Preferably, the hydraulic means is positioned in a compact manner around the center line e.g. by positioning the hydraulic tank central in the center line with the other hydraulic components positioned as symmetrically as possible on the sides of the tank.

In an even further aspect of the invention, said hydraulic means (17) is attached to the wind turbine hub (14).

Hereby, it is possible to create a very rigid construction with a high degree of dependability.

In accordance with the invention, a hydraulic system for controlling the rotating means includes at least two wind turbine blades, and that said system comprises a hydraulic tank (20), at least one hydraulic pump (21, 25), at least two hydraulic actuators (22) actuating said at least two wind turbine blades (4) around the longitudinal axis of said blades with said at least one hydraulic pump (21, 25) pumping hydraulic oil from said hydraulic tank to said least two hydraulic actuators, and said hydraulic system being positioned and rotating around a rotation center line (cl).

In an aspect of the invention, said system further comprises at least one air bleed system (43).

In accordance with the invention, an air bleed system (43) for hydraulic systems incorporated in rotating means, said air bleed system comprising an air bleed tube (19) positioned at the rotation center line (cl) of said hydraulic systems and pivotally connected to said hydraulic systems, an air bleed pipe (34, 41) positioned in said hydraulic system and with an air intake away from said center line (cl), a weight block with a weight-plumbing bar positioned outside said hydraulic system, said air bleed pipe and weight block each being pivotally connected to said air bleed tube, and said air bleed pipe being connected to said weight block in a fixed connection.

In an aspect of the invention, said air bleed pipe (41) is connected to said air bleed tube (38) through an elbow connection (40) and said pivotal connection comprises at least one bearing (39).

In a further aspect of the invention, said weight block (29) weighs more than said air bleed pipe (41).

In an even further aspect of the invention, said system comprises at least two and preferably three capacitive sensors (31) positioned symmetrically around said center line (cl).

THE FIGURES

The invention will now be described in detail with reference to the drawings, in which.

DETAILED DESCRIPTION

FIG. 1 shows a prior art pitch system in a wind turbine. The wind turbine includes a nacelle 2 positioned on top of a wind turbine tower and a yaw mechanism 5 in order to erect the wind turbine rotor blades into the wind. The rotor blades are incorporated in the rotating means of the wind turbine in which a wind turbine hub 14 and a pitch mechanism 15 in a nose cone are also included together with low 10 and high-speed shafts 7 on opposite sides of a gear 9. The high-speed shaft further comprises a mechanical brake and is connected to the electric generator 6.

The necessary force for pitching the blades 4 is supplied by a hydraulic system. The main part of the hydraulic system, such as pumps and a tank 8, is positioned in the nacelle 2 of the wind turbine 1 and supplies hydraulic pressure force to a number of actuators 14 through the low-speed shaft 10 which is hollow as indicated on the figure.

The hydraulic pressure is supplied through the ends of the low-speed shaft in order to supply hydraulic fluid from stationary hydraulic components to the rotating components, e.g. from the pump to the actuators. The low-speed shaft is suspended between a first and a second bearing 11, 12 and is connected to the wind turbine blades 4 through a wind turbine hub 14 and a pitch mechanism 15.

The actuators 13 are positioned in the wind turbine hub or in close proximity of the hub and are connected to the pitch mechanism 15 of each wind turbine blade. The actuators transform the hydraulic pressure into mechanical force used when pitching the blades through the pitch mechanism 15.

Normally, the pitch system may be used to automatically adjust the rotor blades in order to adapt to the wind.

The pitch system may also be used to turn the blades into a position in which the blades are perpendicularly angled in relation to the wind. In this position, the lifting force on the blades disappears and the rotating means of the wind turbine will slow down and finally stop rotating e.g: in situations of excess winds.

Figure 2:
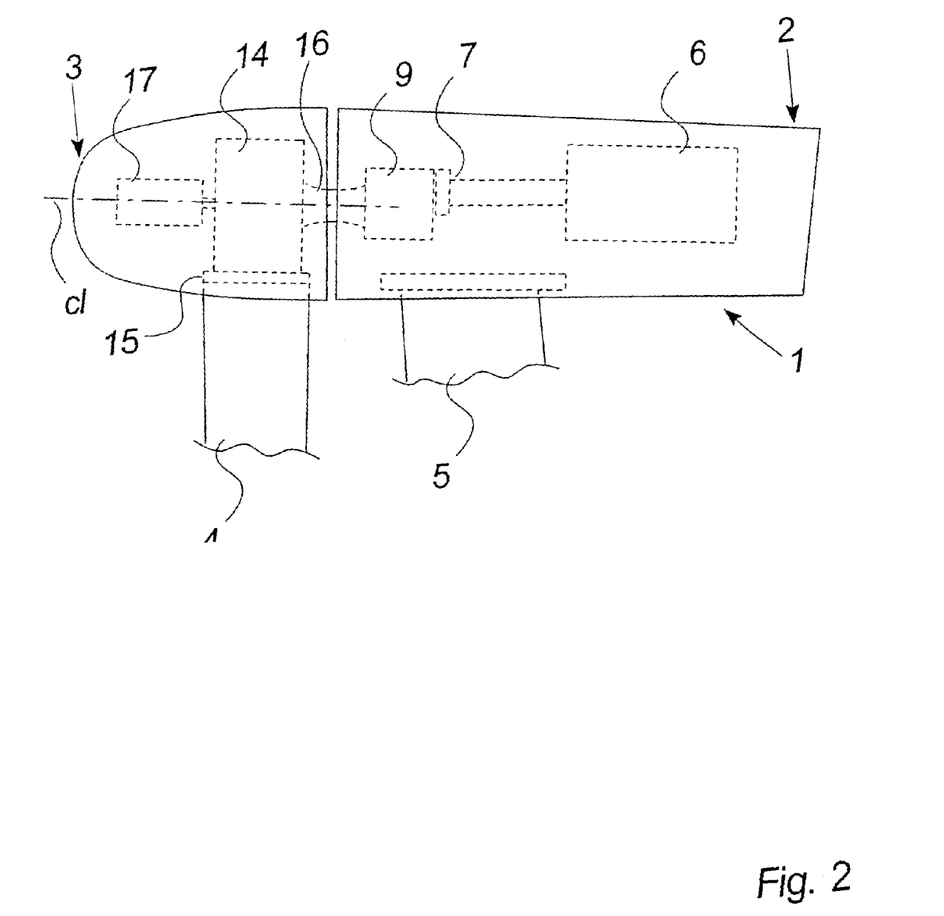
FIG. 2 shows a hydraulic system for a wind turbine according to the invention.

FIG. 2 shows a hydraulic system for a wind turbine according to the invention. The entire hydraulic system 17 is positioned next to the hub 14 on a rotating center line cl in the nose cone 3 and rotates with the rest of the rotating means. The hub is connected to the hydraulic system 17 and the gear 9 through a very short low-speed shaft 16. The length of the shaft means that it is suspended in bearings in front of the gear 9. The remaining components on the figure correspond to the components of FIG. 1.

Figure 3:
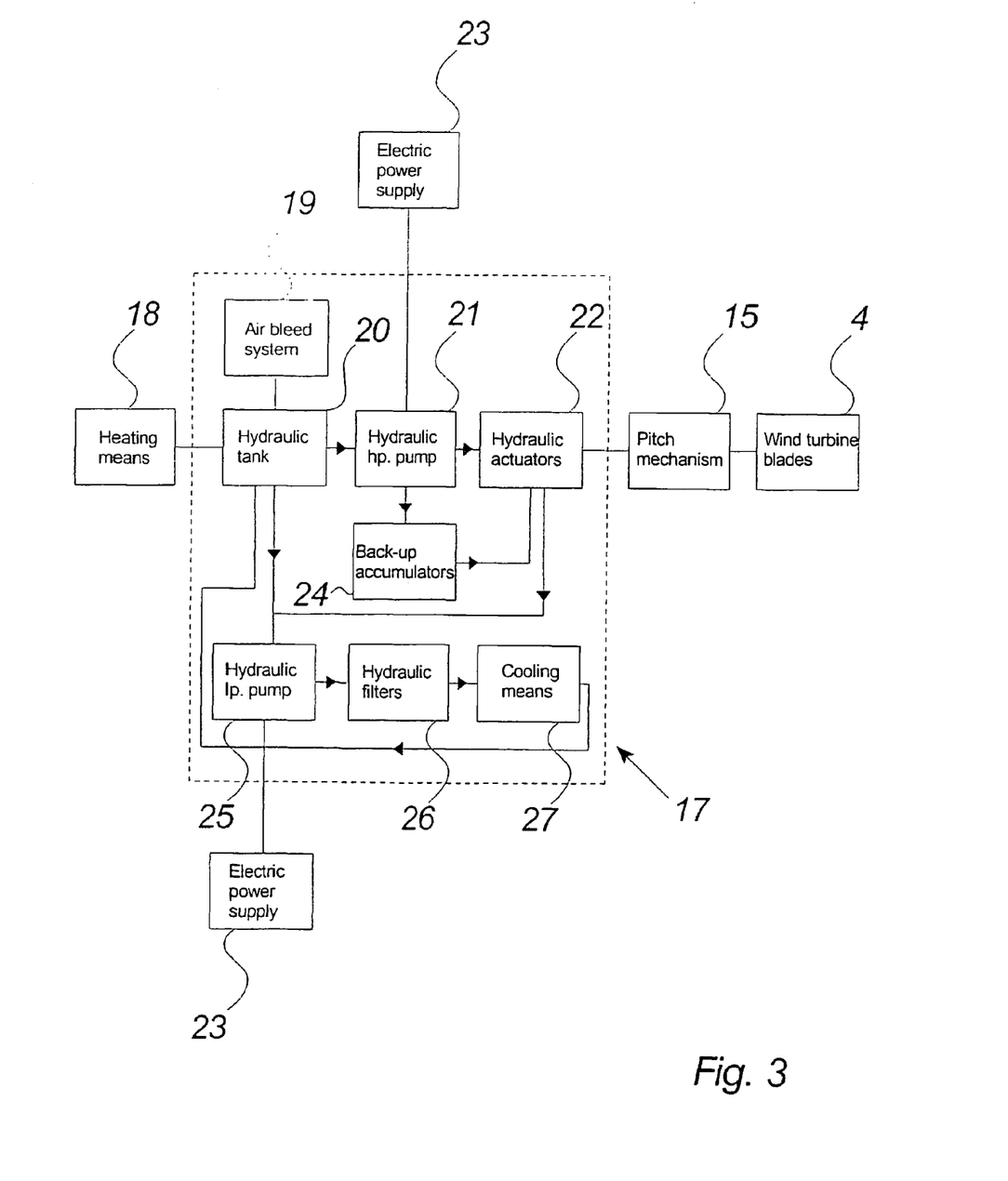
FIG. 3 shows a flow chart of the functionality of a preferred embodiment according to the invention.

FIG. 3 shows a flow chart of the functionality of a preferred embodiment according to the invention.

The chart involves a number of hydraulic components all forming part of the hydraulic system 17. In a normal 3-rotor blade wind turbine, the components are as follows:

A hydraulic tank 20 which contains hydraulic oil for the system. The oil level in the hydraulic tank is normally around ⅔ of the full tank and the rest is filled with air.

A hydraulic high-pressure pump 21 which pumps the hydraulic oil from the tank to the hydraulic actuators 22 at high pressure. The hydraulic high-pressure pump 21 further supplies the back-up accumulators 24 with the necessary pressure during normal functionality.

Each of the three hydraulic actuators 22 is mechanically connected to a pitch mechanism 15 of a wind turbine blade 4, and may turn the blade around the longitudinal axis of the blade.

A low-pressure pump 25 which receives the hydraulic oil from the actuators and the tank and pumps it through hydraulic filters 26 in order to clean out different particles and dirt from the oil. Further, the oil is pumped through cooling means 27 such as an oil cooler with electric fans before it is returned to the hydraulic tank.

The air bleed tube 19 in the hydraulic tank ensures that the relation between air and oil is kept stable by letting air in or out of the tank if necessary.

Three back-up accumulators 24 comprise pressured gas in order to turn the blades to a halt position, e.g. if the hydraulic or the electric system fails and the hydraulic pressure disappears.

In additions to the hydraulic components, the hydraulic system comprises further elements such as heating means 18 including a number of electric heating elements inside the hydraulic tank ensuring that the oil has a certain preferable temperature.

The pumps and some other hydraulic components are supplied with power from an electric power supply 23 which may be positioned away from the hydraulic system and the rotating means.

Figure 4:
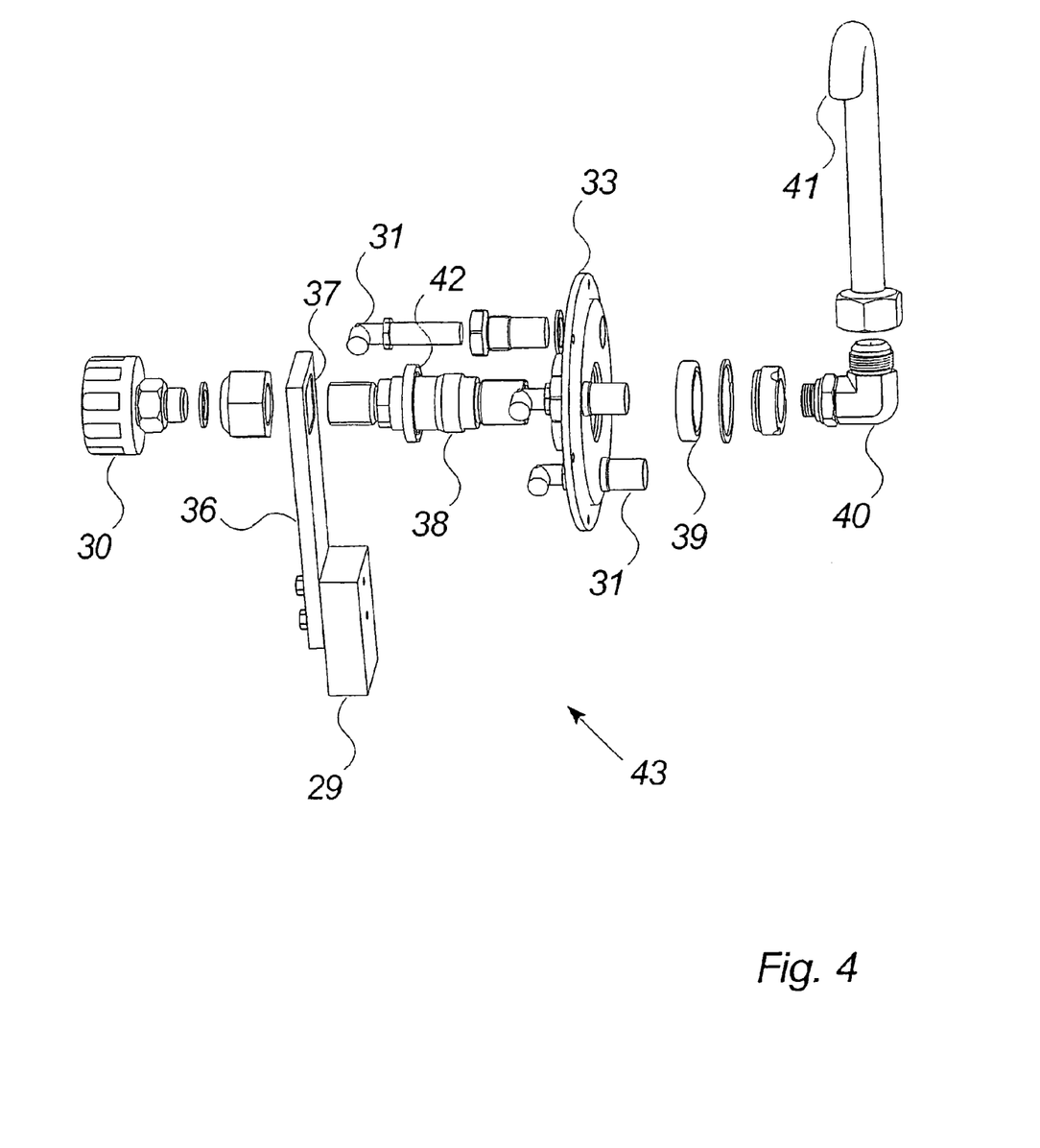
FIG. 4 shows an exploded view of a hydraulic air bleed system according to the invention.

FIG. 4 shows an exploded view of a preferred embodiment of the hydraulic air bleed system according to the invention.

The hydraulic air bleed system 43 is partly positioned inside the hydraulic tank in which the sensor and bearing bracket 33 defines the line between parts inside and outside the hydraulic tank.

The part of the system positioned inside the tank comprises an air bleed pipe 41 shaped as an inverted J. The air bleed pipe 41 is connected to the air bleed tube 38 through the bracket 33 by an elbow connection pipe 40 and a bearing 39. The bearing allows the air bleed tube 38 and the pipes 40, 41 to rotate in relation to the bracket 33.

At the other end of the air bleed tube 38, a weight-plumbing bar 36 is connected through a rectangular hole 37. The hole ensures that the bar follows the air bleed tube when it turns as a kind of shaft in relation to the bracket which is possible by the bearing 39 and a tightening ring 42 being positioned on opposite sides of the bracket. The weight-plumbing bar 36 is provided with a weight block 29 at its low end.

The air bleed tube 38 extends into an air filter 30.

Figure 5:
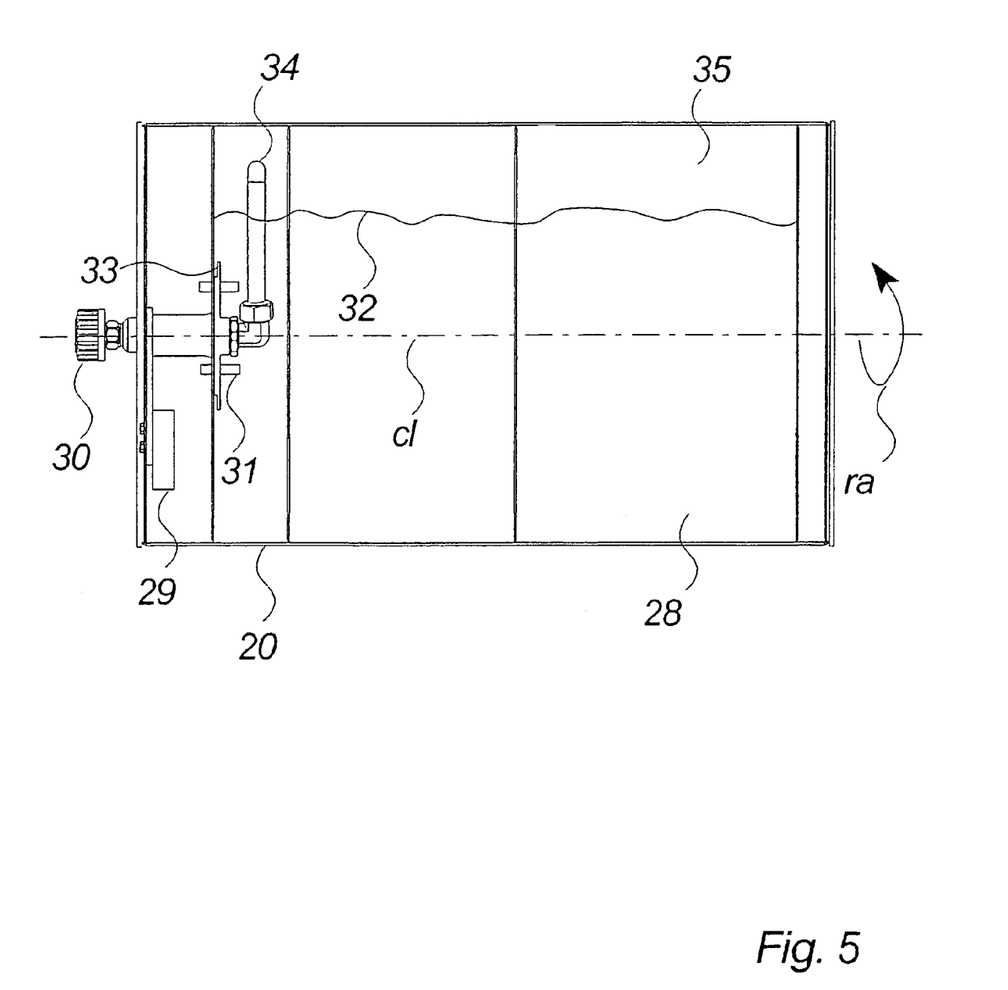
FIG. 5 shows a first view of a hydraulic tank according to the invention.

FIG. 5 shows a first view of a hydraulic tank according to the invention and illustrates the functionality of the air bleed system.

The hydraulic tank is symmetrically positioned around a rotating center line cl.

The hydraulic tank 20 comprises a number of sections filled with hydraulic oil 28 and air 35. The air floats above the oil irrespective of the fact that the tank rotates around the rotating center line cl as indicated by the rotation arrow ra. The separation of oil and air is indicated by the oil surface 32 and, as shown, by the air bleed pipe rising above the oil surface 32.

During the turning of the tank, the weight block 29 and the air bleed pipe 34 will always be vertical with the weight block 29 facing downwards. As the weight block and the pipe are attached to the air bleed tube in a fixed connection and the weight block is heavier than the pipe, gravity will ensure that the air bleed pipe 34 is always vertical in the upwards direction and that the weight block is vertical in the downwards direction.

If the oil pressure in the tank rises, the air pressure will rise and the air bleed system will ensure that the pressure is removed through the tube. Further, the system will ensure that air is sucked in from the outside if the air pressure inside the tank drops significantly. The pressure inside the tank and the oil level may change when oil is pumped in or out of the tank during control of the rotor blades.

The bracket 33 also comprises a number of capacitive sensors 31 which are positioned symmetrically away from the center line cl, e.g. three sensors positioned at given distance from the line and 120 degrees apart. During rotation, the sensors are always in different positions in relation to the oil surface 32 and may as such provide an indication of the oil level in the tank by e.g. one of the three sensors being free of oil, which may indicate that maintenance should soon be carried out, of two of three sensors being free indicating an immediate stop of the wind turbine as the oil level is much too low.

Figure 6:
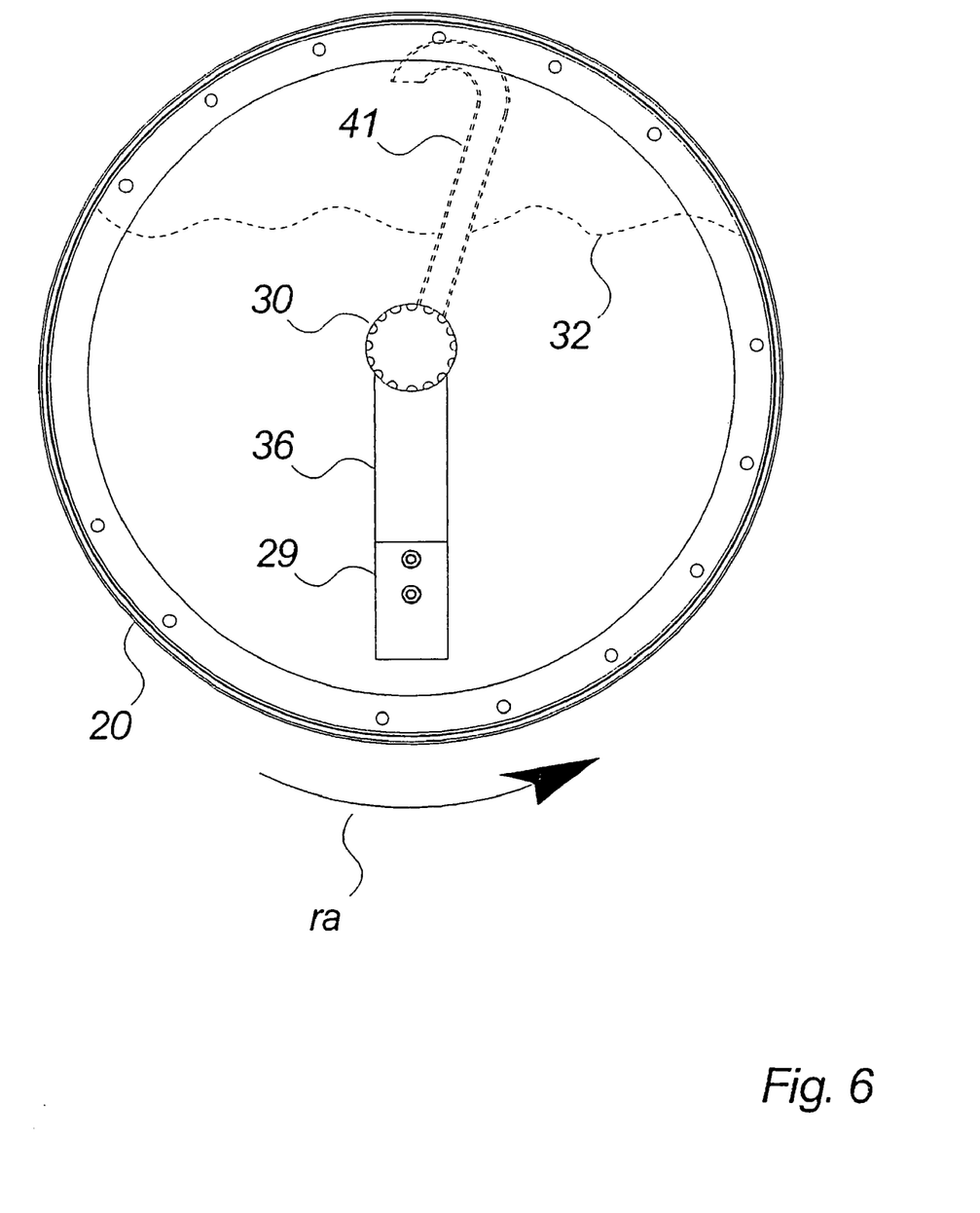
FIG. 6 shows a second view of the hydraulic tank.

FIG. 6 shows a second view of the hydraulic tank in which rotation is clearly indicated by the rotation arrow ra. Further, the relation between the air bleed pipe 41, the weight-plumbing bar 36 and the weight block 29 and their respective positions are indicated.

The weight-plumbing bar 36 and weight block 29 and the air bleed pipe 41 are fixedly connected to the air bleed tube as mentioned above. The air bleed tube, and thus the weight-plumbing bar 36 and the air bleed pipe 41, are pivotally connected to the tank and the rest of the hydraulic system through the bearing 39.

Figure 7:
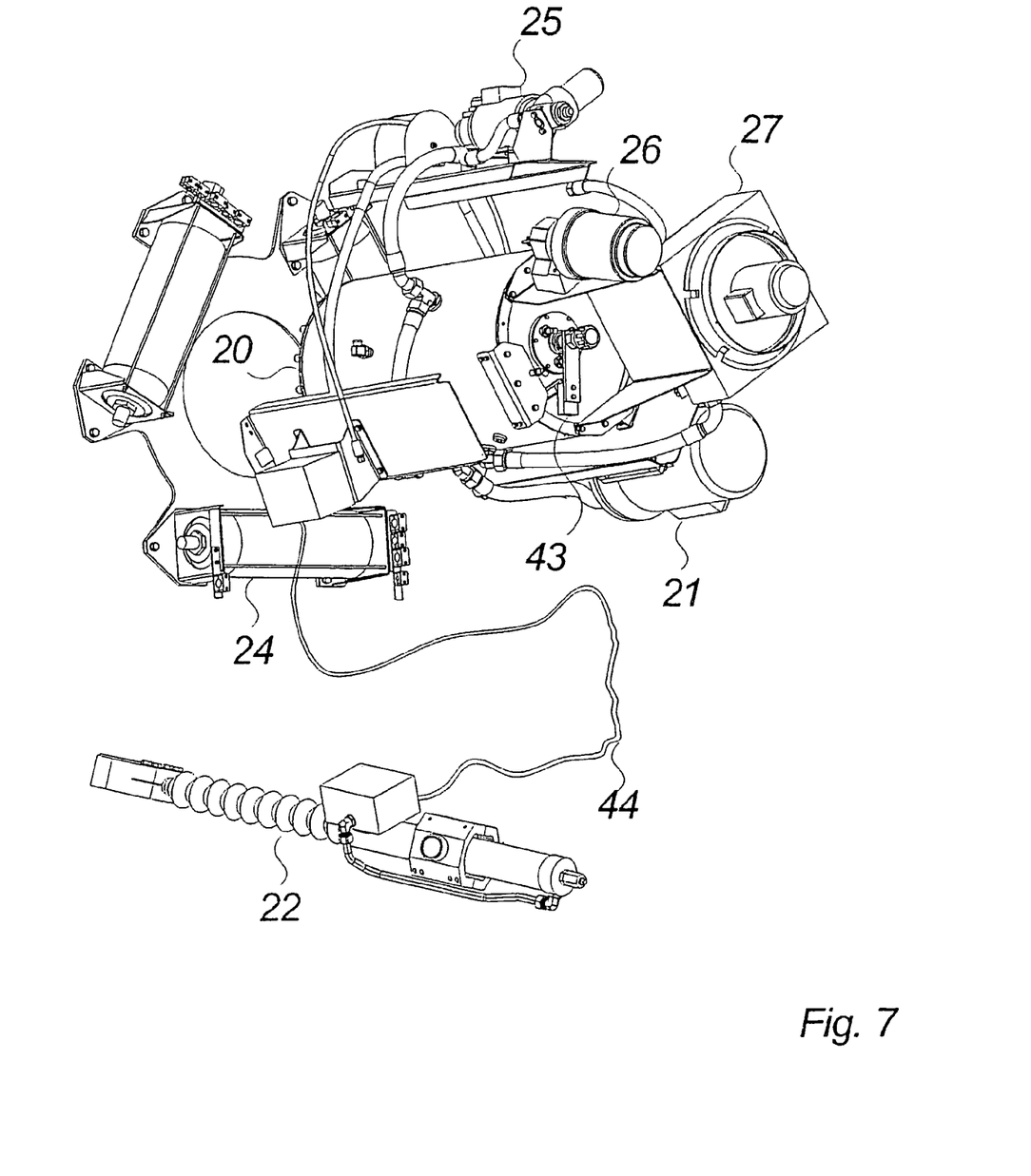
FIG. 7 shows a preferred embodiment of a hydraulic system according to the invention.

FIG. 7 shows a preferred embodiment of a hydraulic system according to the invention (in an exploded view).

The figure shows the hydraulic tank 20 as the center component in the hydraulic system in which other hydraulic components are positioned as symmetrically as possible. The hydraulic components comprise the back-up accumulators 24, the high-pressure pump 21, the low-pressure pump 25, the hydraulic filter 26, the cooling means 27 and the air bleed system 43.

The figure also indicates the necessary hydraulic hoses connecting the different components, including the hose connection 44 connecting the high-pressure pump with one of the actuators 22.

Figure 8:
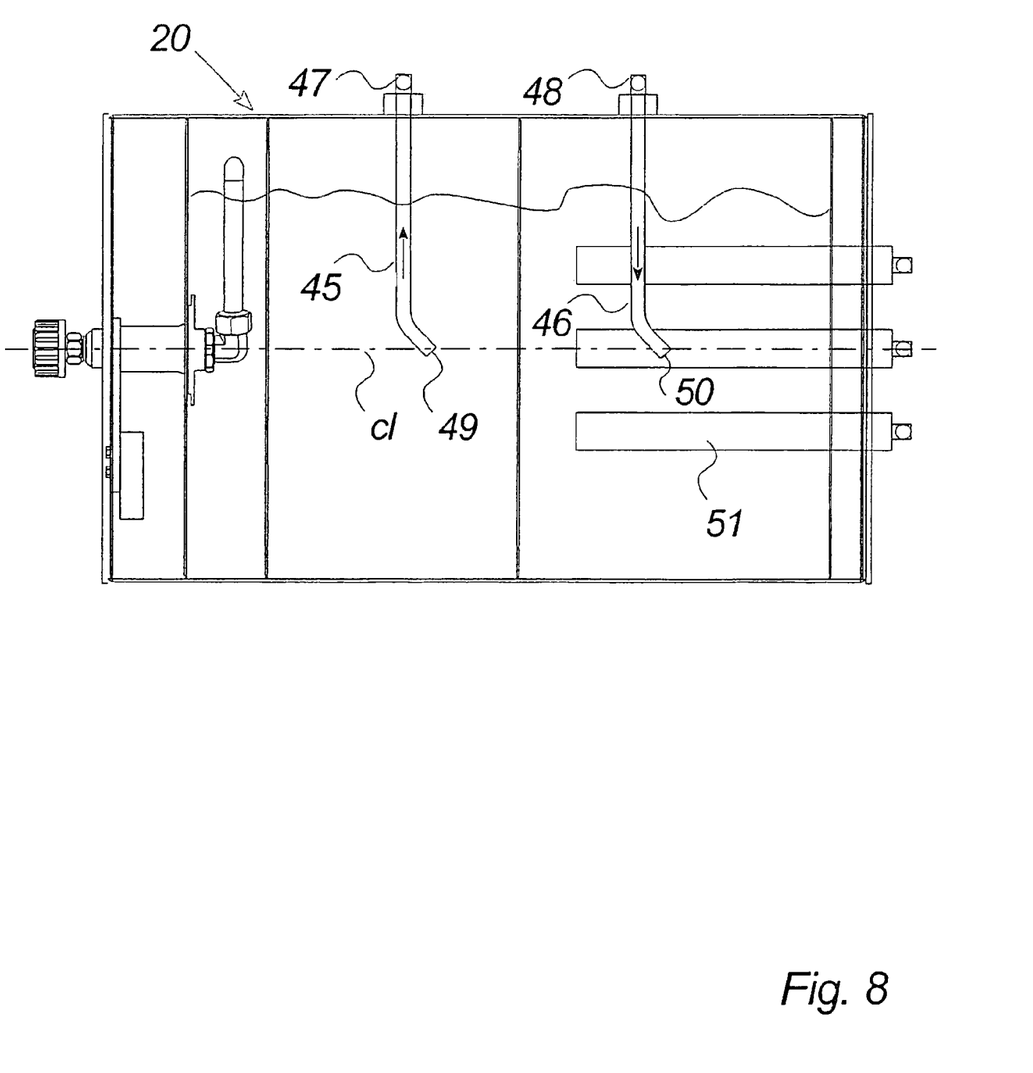
FIG. 8 shows a third view of the hydraulic tank.

FIG. 8 shows a further embodiment of the hydraulic tank 20. The tank has inlet and outlet pipes 45, 46 which extend from the outside hose connections 47, 48 into the tank and they are preferably provided with openings 49, 50 at the center of the tank or close to the center. The center of the tank is represented by the rotating center line cl.

The figure further illustrates the electric heating means 51 ensuring a preferred temperature in the hydraulic oil.

The number or inlet and outlet pipes and the position at which they extend from the surface of the tank may be changed. In an embodiment of the invention, the inlet and outlet hoses may be combined into one hose which acts as inlet and outlet pipes.

LIST

1. Wind turbine
2. Nacelle
3. Nose cone
4. Wind turbine blades
5. Wind turbine tower and yaw mechanism
6. Generator
7. Mechanical brake and high speed shaft
8. Hydraulic system incl. hydraulic pump etc.
9. Gear
10. Hollow low-speed shaft
11. First bearing for low-speed shaft
12. Second bearing for low-speed shaft
13. Hydraulic actuators
14. Hub
15. Pitch mechanism
16. Low-speed shaft
17. Hydraulic system
18. Electric heating means
19. Air bleed tube
20. Hydraulic tank
21. Hydraulic high-pressure (hp) pump
22. Hydraulic actuators
23. Electric power supply
24. Back-up accumulators
25. Hydraulic low-pressure (lp) pump
26. Hydraulic filters
27. Cooling means
28. Hydraulic oil
29. Weight block
30. Air filter
31. Capacitor sensors
32. Hydraulic oil surface
33. Sensor and bearing bracket
34. Air bleed pipe
35. Air
36. Weight-plumbing bar
37. Rectangular hole
38. Air bleed tube and shaft
39. Bearing
40. Elbow connection pipe
41. Air bleed pipe
42. Tightening ring
43. Air bleed system
44. Hydraulic connection hose
45. Outlet pipe
46. Inlet pipe
47. Outside hose connection—outlet
48. Outside hose connection—inlet
49. Opening of outlet pipe inside the tank
50. Opening of inlet pipe inside the tank
51. Electric heating means
cl. Center line
ra. Rotation arrow

The invention claimed is:
1. A power generating system comprising
a wind turbine;
a rotating means associated with said wind turbine, said rotating means including at least two wind turbine blades which are turnable around a longitudinal axis of said blades, and a wind turbine hub connecting said at least two wind turbine blades with at least one shaft, a hydraulic system for actuating said at least two wind turbine blades, the hydraulic system including a hydraulic tank and at least one hydraulic pump;

said hydraulic system, including said hydraulic tank and said hydraulic pump, being incorporated in a nose cone of said rotating means and positioned in relation to a rotation center line of said rotating means, the center line extending through the hydraulic tank; and an electric power supply configured to supply electric power to said at least one hydraulic pump in said hydraulic system.

2. The power generating system according to claim 1, wherein said hydraulic system further includes at least two hydraulic actuators actuating said at least two wind turbine blades, at least one air bleed system, at least one hydraulic filter, and heating means and/or cooling means.

3. The power generating system according to claim 2, wherein hydraulic inlet and outlet pipes extend into the tank.

4. The power generating system according to claim 3, wherein the hydraulic inlet and outlet pipes comprise openings substantially at the rotation center line of said rotating means.

5. The power generating system according to claim 1, wherein said hydraulic system is positioned at the rotation center line of said rotating means.

6. The power generating system according to claim 1, wherein said hydraulic system is attached to the wind turbine hub.

* * * * *